US012767033B2

(12) United States Patent
Chen

(10) Patent No.: US 12,767,033 B2
(45) Date of Patent: Oct. 20, 2026

(54) EXTERNALLY-ADJUSTABLE AWNING MECHANISM FREE OF DISASSEMBLY AND RECREATIONAL VEHICLE

(71) Applicant: Suzhou Shoot Power Equipment Co., Ltd, Suzhou (CN)

(72) Inventor: Liren Chen, Suzhou (CN)

(73) Assignee: Suxhou Shoot Power Equipment Co., Ltd., Suzhou (CN)

( * ) Notice: Subject to any disclaimer, the term of this patent is extended or adjusted under 35 U.S.C. 154(b) by 108 days.

(21) Appl. No.: 18/966,212

(22) Filed: Dec. 3, 2024

(65) Prior Publication Data

US 2025/0091504 A1 Mar. 20, 2025

(30) Foreign Application Priority Data

Nov. 18, 2024 (CN) ......................... 202422804764.8

(51) Int. Cl.
*B60P 3/34* (2006.01)
*E04F 10/06* (2006.01)

(52) U.S. Cl.
CPC .......... *B60P 3/343* (2013.01); *E04F 10/0603* (2013.01); *E04F 10/0644* (2013.01); *E04F 10/0648* (2013.01); *E04F 10/0685* (2013.01)

(58) Field of Classification Search
CPC ... B60P 3/343; E04F 10/0685; E04F 10/0662; E04F 10/0644; E04F 10/0648
See application file for complete search history.

(56) References Cited

U.S. PATENT DOCUMENTS

| | | | | | |
|---|---|---|---|---|---|
| 3,955,611 | A * | 5/1976 | Coles | E04F 10/0648 160/67 |
| 4,180,117 | A * | 12/1979 | Greer | B60P 3/343 160/67 |
| 2006/0087140 | A1 | 4/2006 | Heitel | |
| 2009/0314322 | A1 | 12/2009 | Choi | |
| 2010/0126544 | A1* | 5/2010 | Wagner | E06B 9/74 135/117 |
| 2014/0202511 | A1 | 7/2014 | Choi | |
| 2020/0139795 | A1* | 5/2020 | Boessler | B60J 3/002 |

FOREIGN PATENT DOCUMENTS

| | | | | |
|---|---|---|---|---|
| GB | 638043 A * | 5/1950 | E04F 10/0648 |

* cited by examiner

*Primary Examiner* — Marcus Menezes
(74) *Attorney, Agent, or Firm* — Hemisphere Law, PLLC

(57) ABSTRACT

Disclosed is an externally-adjustable awning mechanism free of disassembly. The awning mechanism includes a reel internally hollowed, and further includes at least one main shaft horizontally located in the reel, a torsional spring body and a locking assembly. The locking assembly includes a supporting arm rotatably connected to the main shaft. One end of the main shaft sequentially extends out of the reel and a surface of the supporting arm and is capable of being locked to the supporting arm by means of a locking member. The other end of the main shaft is rotatably connected to the reel. According to the disclosure, operation is simple and convenient, a torsion force of a torsional spring can be rapidly adjusted, and security and reliability of the entire mechanism can be improved while manufacturing cost of enterprises is reduced.

8 Claims, 5 Drawing Sheets

EXTERNALLY-ADJUSTABLE AWNING MECHANISM FREE OF DISASSEMBLY AND RECREATIONAL VEHICLE

FIELD

The disclosure relates to the technical field of awnings, and particularly relates to an externally-adjustable awning mechanism free of disassembly and a recreational vehicle.

BACKGROUND OF THE INVENTION

An awning is a type of sunshade device with a flexible tarpaulin that can be inclined downward and unwound or wound at an included angle of 0 degree to 15 degrees relative to a horizontal plane in a windable mode. It is an excellent external sunshade product, and has a high market share because of its convenient and labor-saving operation.

For awning products on the current market that are wound by means of torsional springs, it is impossible to adjust tightness of their tarpaulins without disassembling such awning products once they are mounted completely. In actual use, if an awning is unused for a long time or used all the time, its spring will rebound and become fatigued. As a result, a tarpaulin will become excessively loose and concaved in the middle or one end. Then, rainwater will flow into the tarpaulin from sides or backwards, the tarpaulin will leak water, and an expansion bin cover will be soaked in water, decayed and damaged. In order to ensure that the awning tarpaulin always keeps tightened, a torsion force of a rebounding torsional spring must be adjusted, so as to ensure that the awning tarpaulin always keeps tightened.

For almost all awnings with expansion bins on the current market, if a torsion force of a torsional spring needs to be adjusted, at least a supporting arm mounting assembly on one side to be adjusted has to be disassembled at first, and then the torsion force (resilience) of the torsional spring is adjusted by rotating the supporting arm. Such a method is extremely dangerous. In a case of a hand slip, it is highly likely to hit the hand and cause unnecessary harm to a human body. In serious cases, irreparable harm is probable.

Thus, the disclosure provides an externally-adjustable awning mechanism free of disassembly and a recreational vehicle, so as to solve the above problems.

SUMMARY OF THE INVENTION

To overcome the defects, an objective of the disclosure is to provide an externally-adjustable awning mechanism free of disassembly and a recreational vehicle. According to the disclosure, operation is simple and convenient, a torsion force of a torsional spring can be rapidly adjusted, and security and reliability of the entire mechanism can be improved while manufacturing cost of enterprises is reduced.

In order to achieve the objective, the disclosure uses the following technical solution: an externally-adjustable awning mechanism free of disassembly. The awning mechanism includes a reel internally hollowed, and further includes at least one main shaft horizontally located in the reel, a torsional spring body and a locking assembly. The locking assembly includes a supporting arm rotatably connected to the main shaft. One end of the main shaft sequentially extends out of the reel and a surface of the supporting arm and is capable of being locked to the supporting arm by means of a locking member. The other end of the main shaft is rotatably connected to the reel. The torsional spring body is arranged at a periphery of the main shaft in a sleeving manner. One end of the torsional spring body is fixedly connected to one end of the main shaft close to the supporting arm. The other end of the torsional spring body is fixedly connected to an inner wall of the reel.

Further, a hexagonal nut is fixedly arranged at one end of the main shaft extending out of the supporting arm. The hexagonal nut is fixed to the main shaft by means of an elastic pin.

Further, the awning mechanism further includes an adjusting assembly detachably connected to the hexagonal nut. The adjusting assembly includes an adjusting round handle and an adjusting hexagonal recess. The adjusting hexagonal recess is matched with the hexagonal nut in shape. When a torsion force of the torsional spring body is adjusted, the hexagonal nut is sleeved with the adjusting round handle, and then rotating adjustment is conducted. Thus, rotating adjustment of the main shaft is faster and more convenient, and is more labor-saving than direct rotation of the main shaft with a human hand.

Further, an end of one side of the main shaft close to the supporting arm is provided with several locking insertion holes. The supporting arm includes a locking part and a fixing part arranged from top to bottom. A limiting hole corresponding to the locking insertion holes is provided on one side of the locking part close to the main shaft. When the main shaft needs to be locked to the supporting arm, only the locking member needs to be inserted into the limiting hole and the locking insertion holes. The torsion force of the torsional spring body can be adjusted only by pulling out the locking member and rotating the main shaft. Thus, operation is simple and quick.

Further, the locking member is a B-shaped pin. When the B-shaped pin is inserted into the locking insertion holes and the limiting hole, an upper horizontal surface on the B-shaped pin abuts against an abutting surface of the locking part. It is ensured that the main shaft is incapable of rotating relative to the supporting arm after the B-shaped pin positions the supporting arm and the main shaft. Stability of torsion adjustment of the torsional spring body is ensured.

Further, one side of the supporting arm away from the main shaft is horizontally provided with an accommodation recess configured to accommodate the hexagonal nut. The accommodation recess is provided with a detachable decorative cover. The accommodation recess is capable of protecting the hexagonal nut, such that the hexagonal nut is prevented from rusting after being used for a long time. The decorative cover is arranged to protect the hexagonal nut and also make the entire mechanism more attractive.

Further, one end, not fixed to the main shaft, of the torsional spring body is fixedly connected to the inner wall of the reel by means of a torsional spring limiting block.

A recreational vehicle includes any one of the awning mechanisms, and further includes a recreational vehicle compartment and an expansion bin capable of sliding out of a surface of one side of the recreational vehicle compartment. A supporting arm further includes a fixing part located at a lower portion. The fixing part is detachably connected to the expansion bin by means of a connecting assembly.

Further, the connecting assembly includes a mounting support arranged on a top of an external wall of the expansion bin and a polygonal extension rod horizontally inserted into the mounting support. One end of the polygonal extension rod close to the supporting arm extends into a limiting recess on the fixing part.

Further, a top of the recreational vehicle compartment is provided with a tarpaulin track configured to fix one end of an awning tarpaulin. Two sides of the awning tarpaulin are provided with lines. The lines are mounted in the tarpaulin track so as to fix and tighten the awning tarpaulin. The other end of the awning tarpaulin is fixedly wound around a reel. The reel is also provided with an awning tarpaulin fixing groove. A fixing method is to fix the other end of the awning tarpaulin by enabling the lines provided on the awning tarpaulin to penetrate the fixing groove, such that the awning tarpaulin is conveniently wound around the reel.

The disclosure has beneficial effects:

1. In the disclosure, through mutual cooperation of the reel, the main shaft, the torsional spring body and the locking assembly, one end, fixed to the torsional spring body, of the main shaft extends out of the reel and the supporting arm, such that the torsion force of the torsional spring body may be adjusted without disassembling the entire supporting arm. Steps of disassembly and re-mounting are omitted, and operation is simple and convenient. A torsion force of a torsional spring can be quickly adjusted, and meanwhile, mounting labor cost and enterprise manufacturing cost are reduced.
2. In the disclosure, the supporting arm and the main shaft are adjusted and then locked by the B-shaped pin, such that a structure is simple and convenient, operation is quick, and operation and use by workers are facilitated.
3. In the disclosure, the hexagonal nut is arranged at the end of the main shaft extending out of the supporting arm, and the adjusting round handle may be directly arranged on the hexagonal nut in a sleeving manner, such that the torsion force of the torsional spring body can be quickly adjusted, the adjusting round handle can be used once inserted. A surface of the adjusting round handle is smooth without any edges and corners. Thus, a human body cannot be damaged even if the adjusting round handle is released from a hand. Further, security and reliability of the entire mechanism are improved.

Figure 1:
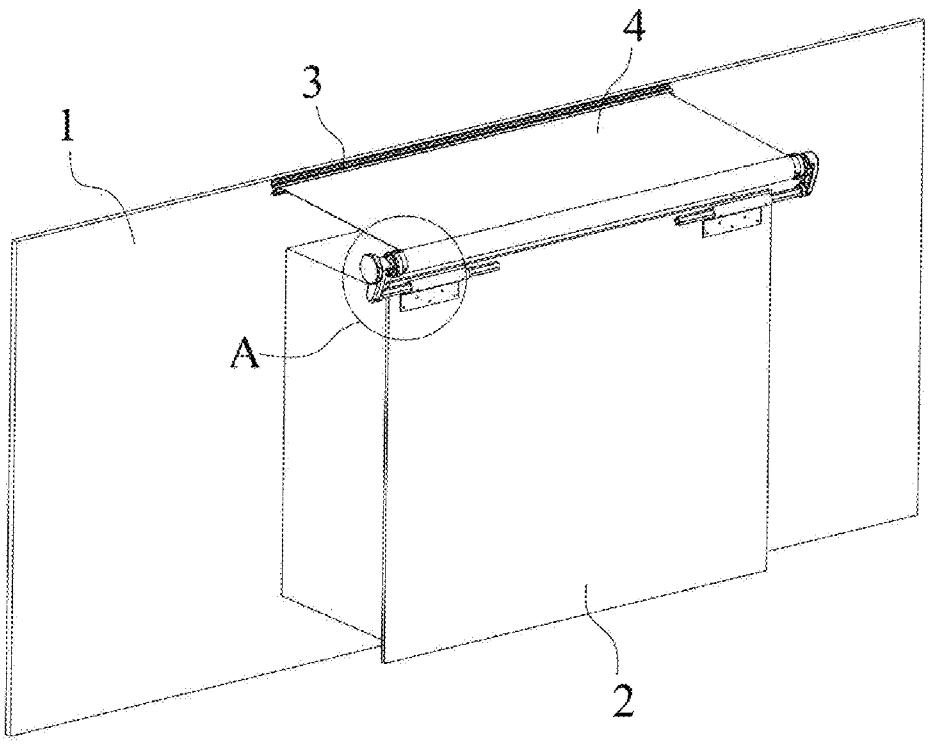
FIG. 1 is an isometric view of an entire structure according to one example of the disclosure.
Figure 2:
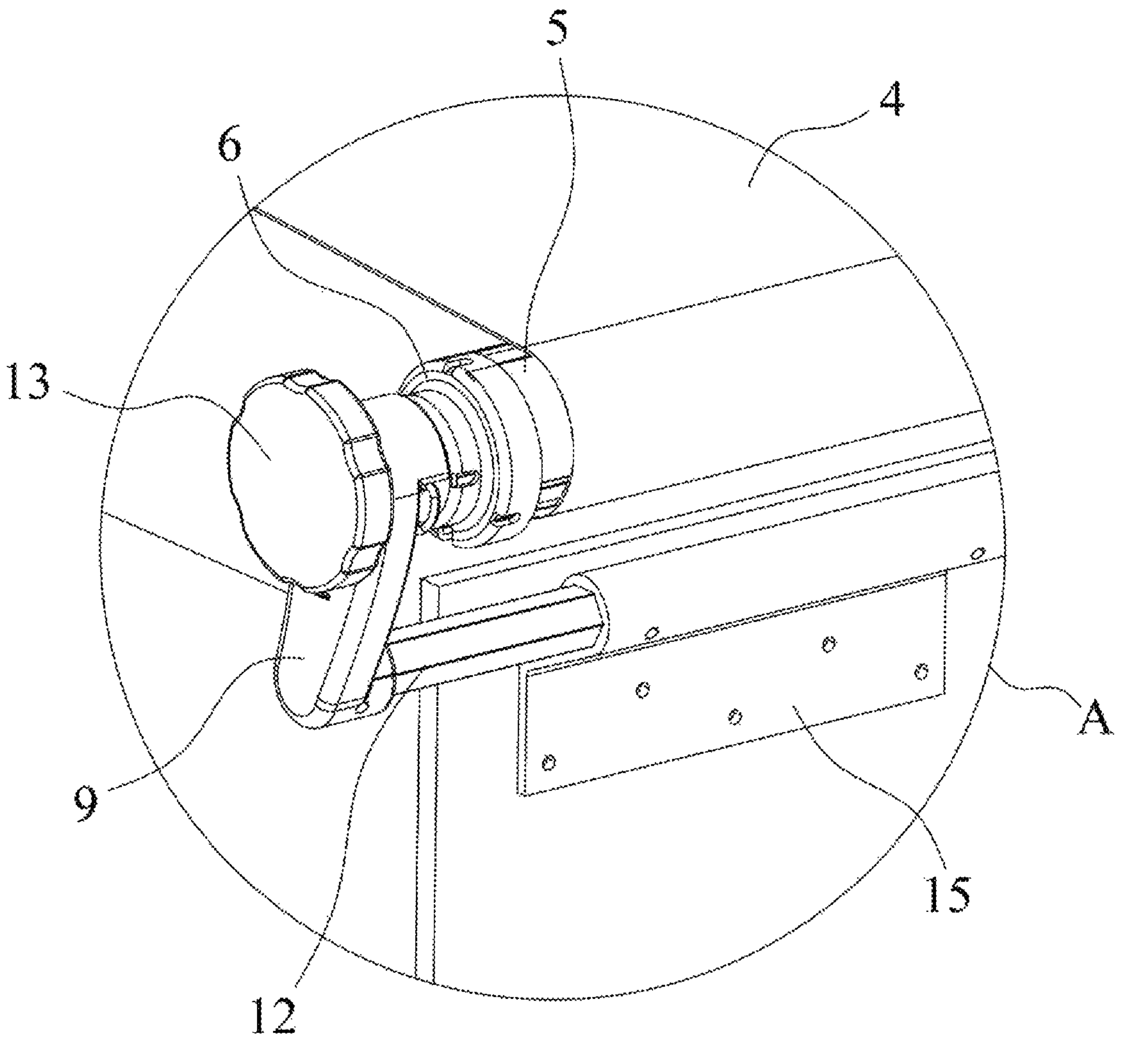
FIG. 2 is a schematic diagram of an enlarged structure of A in FIG. 1.
Figure 3:
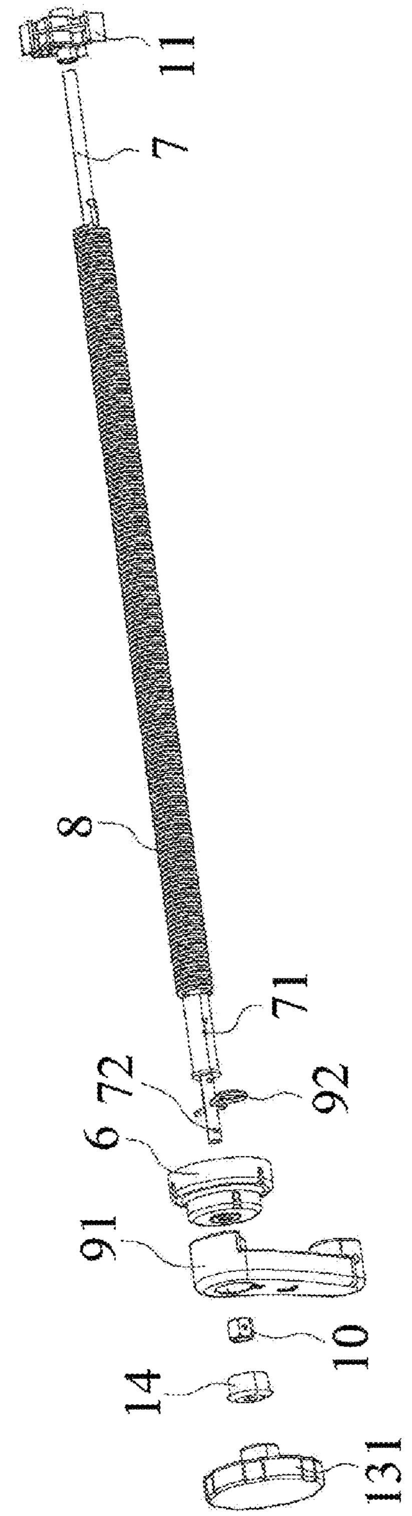
FIG. 3 is a schematic diagram of an exploded view of a partial structure according to one example of the disclosure.
Figure 4:
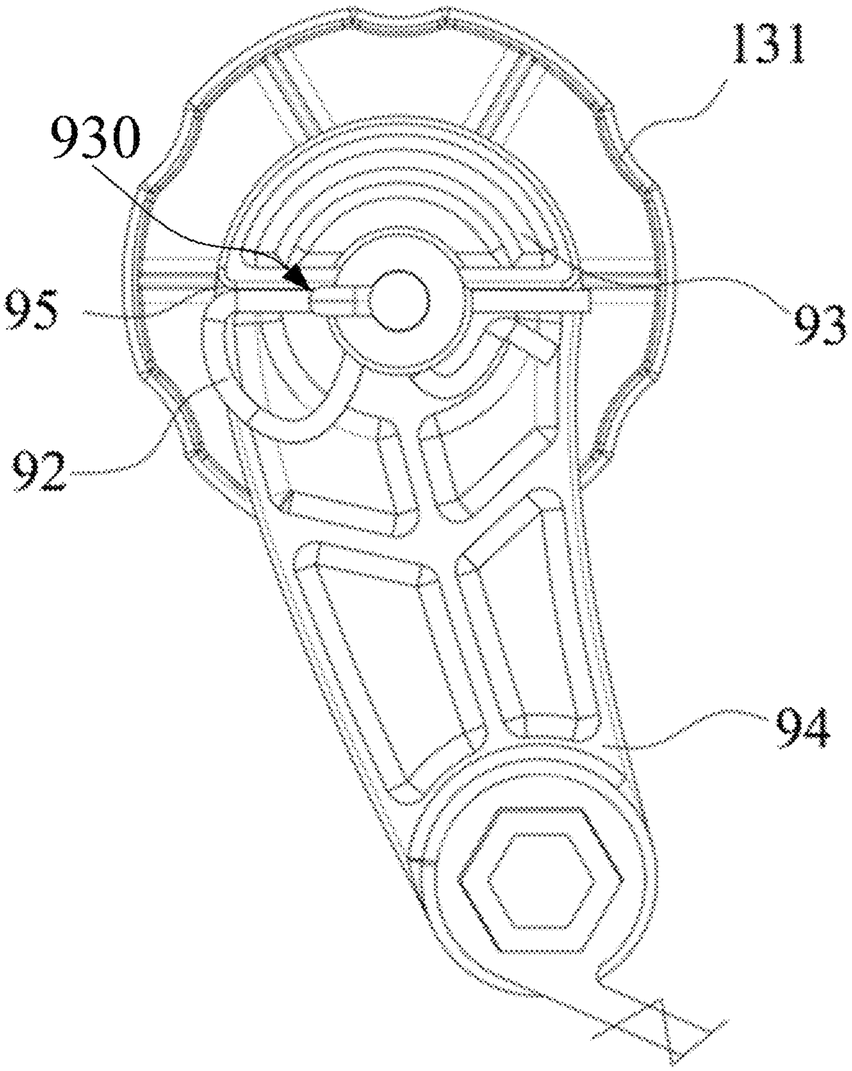
FIG. 4 is a schematic diagram of a partial structure according to one example of the disclosure.
Figure 5:
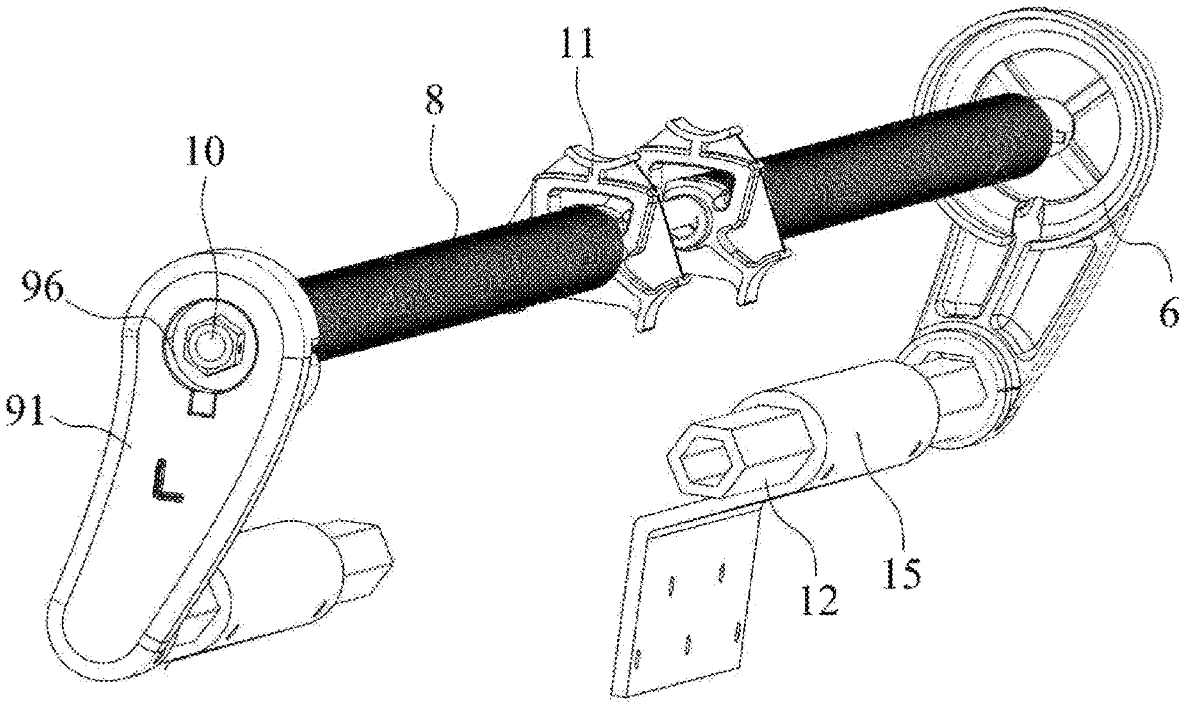
FIG. 5 is an isometric view of a partial structure according to one example of the disclosure.

In the figures: 1, recreational vehicle compartment; 2, expansion bin; 3, tarpaulin track; 4, awning tarpaulin; 5, reel; 6, end cover; 7, main shaft; 71, torsional spring fixing hole; 72, locking insertion hole; 8, torsional spring body; 9, locking assembly; 91, supporting arm; 92, B-shaped pin; 93, locking part; 94, fixing part; 95, abutting surface; 96, accommodation recess; 10, hexagonal nut; 11, torsional spring limiting block; 12, polygonal extension rod; 13, adjusting assembly; 131, adjusting round handle; 14, decorative cover; and 15, mounting support.

DETAILED DESCRIPTION OF THE INVENTION

Preferred examples of the disclosure will be described in detail below in combination with accompanying drawings, such that advantages and features of the disclosure can be more readily understood by those skilled in the art, thereby defining the protection scope of the disclosure clearer.

A principle of adjusting tightness of an awning tarpaulin 4 is as follows: one end of a torsional spring body 8 is kept to be fixed to a reel 5 while the other end of the torsional spring body is kept to be fixed to a main shaft 7. The main shaft 7 rotates to drive one end, fixedly connected to the main shaft, of the torsional spring body 8 to rotate, such that resilience of the torsional spring body 8 is increased or decreased, thus implementing tightness adjustment.

According to an awning mechanism in the prior art, a supporting arm 91 is fixedly connected to the main shaft 7 extending out of an end cover 6, and one end of the supporting arm 91 away from the end cover 6 is fixedly connected to an expansion bin 2 by means of a detachable polygonal extension rod 12. In this way, the awning tarpaulin 4 may be unwound and kept in a tight state after the expansion bin 2 is opened.

As the resilience of the torsional spring body 8 changes after long-term use and the awning tarpaulin 4 is exceedingly loose, a rebounding torsion force of a torsional spring needs to be adjusted to ensure that the awning tarpaulin may be completely closed after wound. In a case of adjusting the tightness, a worker needs to hold the supporting arm 91 with one hand, pull the polygonal extension rod 12 out of the supporting arm 91 with the other hand, and disassembles the supporting arm 91 from the expansion bin 2, such that one end, connected to the main shaft 7, of the supporting arm 91 is in a rotatable state, and a disassembly process is laborious. Meanwhile, when the polygonal extension rod 12 is pulled out, the torsion force of the torsional spring body 8 in the reel 5 is very large. In a case of a hand slip, the resilience of the spring is instantly released, it is likely to hit the hand and cause accidental injury.

In order to solve the problems, with reference to FIGS. 2-5, the disclosure provides an externally-adjustable awning mechanism free of disassembly. The awning mechanism includes a reel 5 internally hollowed, and further includes at least one main shaft 7 horizontally located in the reel 5, a torsional spring body 8 and a locking assembly 9. The locking assembly 9 includes a supporting arm 91 rotatably connected to the main shaft 7. One end of the main shaft 7 sequentially extends out of the reel 5 and a surface of the supporting arm 91 and is capable of being locked to the supporting arm 91 by means of a locking member. The other end of the main shaft is rotatably connected to the reel 5. It should be noted that the supporting arm 91 is vertically arranged, and one end, not connected to the main shaft 7, of the supporting arm is fixed on the recreational vehicle.

The torsional spring body 8 is arranged on a periphery of the main shaft 7 in a sleeving manner. One end of the torsional spring body is fixedly connected to one end of the main shaft 7 close to the supporting arm 91. The other end of the torsional spring body is fixedly connected to an inner wall of the reel 5. One end of the main shaft 7 close to the supporting arm 91 is provided with several penetrating torsional spring fixing holes 71, such that the torsional spring body 8 is fixed.

The awning tarpaulin 4 is pulled and unwound to drive the reel 5 to rotate synchronously, and one end, fixedly connected to the reel 5, of the torsional spring body 8 generates a spring torsion force under rotation and is in an open state. When the awning tarpaulin 4 needs to be wound, the torsional spring body 8 drives the awning tarpaulin 4 to be wound automatically under the action of the spring torsion force.

When the torsion force of the torsional spring body 8 needs to be adjusted, the awning tarpaulin 4 is adjusted to a wound state. In this case, the awning tarpaulin 4 and a tarpaulin track 3 are just in a tightened state, and the locking member configured to lock the supporting arm 91 and the main shaft 7 is pulled out. Then, the main shaft 7 may rotate relative to the supporting arm 91, and the entire main shaft 7 and the torsional spring body 8 on the main shaft may be rotated only by clockwise or counterclockwise rotating part of the main shaft 7 extending out of the supporting arm 91. In the rotation process, a counter-acting force relative to the torsional spring body 8 is formed just with tension of the awning tarpaulin 4, and the torsion force of the torsional spring body 8 is adjusted by combining the tightness of the awning tarpaulin. After the tightness is determined, the locking member is inserted into the corresponding locking insertion holes 72 on the supporting arm 91 and the main shaft 7, and the torsion force of the torsional spring body 8 is adjusted.

It should be noted that in the adjustment process, the torsion force of the torsional spring can be adjusted without disassembling the supporting arm 91, such that both time and labor are saved. Meanwhile, the supporting arm 91 cannot swing left and right under the action of the torsion force of the torsional spring, so as to avoid harm to a human body.

A hexagonal nut 10 is fixedly arranged at one end of the main shaft 7 extending out of the supporting arm 91. Specifically, in some examples, the hexagonal nut 10 is fixed to the main shaft by means of an elastic pin. It should be noted that a fixing method between the hexagonal nut and the main shaft is not limited, as long as the main shaft may rotate while the hexagonal nut is rotated.

The awning mechanism further includes an adjusting assembly 13 detachably connected to the hexagonal nut 10. The adjusting assembly 13 includes an adjusting round handle 131 and an adjusting hexagonal recess. The adjusting hexagonal recess is matched with the hexagonal nut 10 in shape. When a torsion force of the torsional spring body 8 is adjusted, the hexagonal nut 10 is sleeved with the adjusting round handle 131, and then rotating adjustment is conducted. Thus, rotating adjustment of the main shaft 7 is faster and more convenient, and is more labor-saving than direct rotation of the main shaft 7 with a human hand.

In some examples, a periphery of the adjusting round handle 131 is provided with a plurality of notches convenient for workers to hold. A part, connected to the periphery, of each of the notches is provided with a chamfer of greater than 2 mm. A surface of the entire adjusting round handle 131 is smooth and has no sharp edges and corners. In a case of accidentally releasing the handle, compared with a case of rotating the supporting arm 91, no harm to the human body can be ensured. With reference to optimal grip strength of ordinary adults, a diameter is set as 75 mm. A number of the notches is specifically set as 6, such that hand slips can be effectively avoided.

An end of one side of the main shaft 7 close to the supporting arm 91 is provided with several locking insertion holes 72. The supporting arm 91 includes a locking part 93 and a fixing part 94 arranged from top to bottom. A limiting hole 930 corresponding to the locking insertion holes 72 is provided on one side of the locking part 93 close to the main shaft 7. When the main shaft 7 needs to be locked to the supporting arm 91, only the locking member needs to be inserted into the limiting hole 930 and the locking insertion holes 72. When the torsion force of the torsional spring body 8 needs to be adjusted, the main shaft 7 may be rotated by pulling out the locking member. Thus, operation is simple and quick.

Specifically, several locking insertion holes 72 are spaced in a length direction of the main shaft 7, and a circumference of the main shaft 7 is further provided with several locking insertion holes 72, such that torsion adjustment of different rotation angles is satisfied.

The locking member is a B-shaped pin 92. When the B-shaped pin 92 is inserted into the locking insertion holes 72 and the limiting hole, an upper horizontal surface on the B-shaped pin abuts against an abutting surface 95 of the locking part 93. It is ensured that the main shaft 7 is incapable of rotating relative to the supporting arm 91 after the B-shaped pin 92 positions the supporting arm 91 and the main shaft 7. Stability of torsion adjustment of the torsional spring body 8 is ensured.

One side of the supporting arm 91 away from the main shaft 7 is horizontally provided with an accommodation recess 96 configured to accommodate the hexagonal nut 10. The accommodation recess 96 is provided with a detachable decorative cover 14. The accommodation recess 96 is capable of protecting the hexagonal nut 10, such that the hexagonal nut is prevented from rusting after being used for a long time. The decorative cover 14 is arranged to protect the hexagonal nut 10 and also make the entire mechanism more attractive.

One end, not fixed to the main shaft 7, of the torsional spring body 8 is fixedly connected to the inner wall of the reel 5 by means of a torsional spring limiting block 11.

In some examples, two main shafts 7 are sequentially arranged in a horizontal direction. The main shafts 7, the torsional spring body 8, the locking assembly 9 and the adjusting assembly 13 are all symmetrically arranged along a center line of the reel 5. One ends of the two main shafts 7 away from each other may extend out of two supporting arms 91 at two ends of the reel 5 respectively. Thus, the awning tarpaulin 4 is more stable to wind or unwind.

The two ends of the reel 5 are each fixedly provided with one end cover 6. When the main shaft 7 extends out of the reel 5, the main shaft firstly penetrates the end cover 6 on the reel 5, and the end cover 6 and the torsional spring limiting block 11 cooperate with each other, so as to support the entire main shaft 7.

One side of the end cover 6 close to the reel 5 is provided with a plurality of rivet holes in a spaced manner along the periphery. A rivet is inserted into each of the rivet holes correspondingly, so as to fix the reel 5 to the end cover 6. In this way, the torsional spring body 8, the main shaft 7 and other structures in the reel 5 are protected.

Two sides of the end cover 6 are each provided with one soundproofing pad, so as to reduce friction noise between the end cover 6 and the supporting arm 91.

In some other examples, only one main shaft 7 may be provided. One end of the main shaft extends out of the reel 5 and the surface of the supporting arm 91, and the other end of the main shaft is rotatably connected to the reel 5. Winding and unwinding of the awning tarpaulin 4 cannot be influenced. In this case, one end of the reel 5 away from the supporting arm 91 may be provided with the end cover 6 or the torsional spring limiting block 11.

With reference to FIG. 1, a recreational vehicle includes any one of the awning mechanisms, and further includes a recreational vehicle compartment 1 and an expansion bin 2 capable of sliding out of a surface of one side of the recreational vehicle compartment 1. The expansion bin 2 is slidably connected to the recreational vehicle compartment by means of a rack track arranged in a width direction of the recreational vehicle compartment 1.

A supporting arm 91 further includes a fixing part 94 located at a lower portion. The fixing part 94 is detachably connected to the expansion bin 2 by means of a connecting assembly. When the expansion bin 2 slides out of the recreational vehicle compartment 1, the reel 5 rotates while the awning tarpaulin 4 is unwound, and one end, fixedly connected to the reel 5, of the torsional spring body 8 rotates to generate a spring torsion force. When the awning tarpaulin needs to be wound, the expansion bin 2 is moved back to the recreational vehicle compartment 1, such that the tarpaulin may be automatically retracted under the action of the spring torsion force.

The connecting assembly includes a mounting support 15 arranged on a top of an external wall of the expansion bin 2 and a polygonal extension rod 12 horizontally inserted into the mounting support 15. One end of the polygonal extension rod 12 close to the supporting arm 91 extends into a limiting recess on the fixing part 94.

In some examples, the polygonal extension rod 12 is a hexagonal extension rod, and the limiting recess is matched with the hexagonal extension rod in shape. When the hexagonal extension rod is inserted into the limiting recess, the supporting arm 91 cannot rotate and thus is vertically arranged more stably.

It should be noted that the mounting support 15 is provided with a hexagonal through slot which is configured to allow the hexagonal extension rod to be inserted into and matched with the hexagonal extension rod in shape.

A top of the recreational vehicle compartment is provided with a tarpaulin track 3 configured to fix one end of an awning tarpaulin 4. Two sides of the awning tarpaulin 4 are provided with lines. The lines are mounted in the tarpaulin track 3 so as to fix and tighten the awning tarpaulin. The other end of the awning tarpaulin 4 is fixedly wound around a reel. The reel is also provided with an awning tarpaulin fixing groove. A fixing method is to fix the other end of the awning tarpaulin by enabling the lines provided on the awning tarpaulin to penetrate the fixing groove, such that the awning tarpaulin is conveniently wound around the reel.

The above embodiments are only for explaining technical concepts and characteristics of the disclosure, and aim to enable those skilled in the art to know the content of the disclosure and implement it. The content cannot limit the protection scope of the disclosure. All equivalent changes or modifications made according to the spirit of the disclosure should fall within the protection scope of the disclosure.

The invention claimed is:

1. An externally-adjustable awning mechanism free of disassembly, comprising a reel internally hollowed, and further comprising at least one main shaft horizontally located in the reel, a torsional spring body and a locking assembly, wherein the locking assembly comprises a supporting arm rotatably connected to the main shaft, one end of the main shaft sequentially extends out of the reel and a surface of the supporting arm and is capable of being locked to the supporting arm by means of a locking member, the other another end of the main shaft is rotatably connected to the reel, the torsional spring body is arranged at a periphery of the main shaft in a sleeving manner, one end of the torsional spring body is fixedly connected to one end of the main shaft close to the supporting arm, and the another end of the torsional spring body is fixedly connected to an inner wall of the reel; and a hexagonal nut is fixedly arranged at the end of the main shaft extending out of the supporting arm;

wherein the externally-adjustable awning mechanism further comprises an adjusting assembly detachably connected to the hexagonal nut, wherein the adjusting assembly comprises an adjusting round handle configured to be engaged with the hexagonal nut so that rotation of the adjusting round handle is capable of rotating the hexagonal nut.

2. The externally-adjustable awning mechanism free of disassembly according to claim 1, wherein an end of the side of the main shaft close to the supporting arm is provided with several locking insertion holes, the supporting arm comprises a locking part and a fixing part arranged from top to bottom, and a limiting hole corresponding to the locking insertion holes is provided on one side of the locking part close to the main shaft.

3. The externally-adjustable awning mechanism free of disassembly according to claim 2, wherein the locking member is a B-shaped pin, and when the B-shaped pin is inserted into one of the locking insertion holes and the limiting hole, an upper horizontal surface on the B-shaped pin abuts against an abutting surface of the locking part.

4. The externally-adjustable awning mechanism free of disassembly according to claim 1, wherein one side of the supporting arm away from the main shaft is horizontally provided with an accommodation recess configured to accommodate the hexagonal nut, and the accommodation recess is provided with a detachable decorative cover.

5. The externally-adjustable awning mechanism free of disassembly according to claim 1, wherein one end, not fixed to the main shaft, of the torsional spring body is fixedly connected to the inner wall of the reel by means of a torsional spring limiting block.

6. A recreational vehicle, comprising the awning mechanism according to claim 1, and further comprising a recreational vehicle compartment and an expansion bin capable of sliding out of a surface of one side of the recreational vehicle compartment, wherein the supporting arm further comprises the fixing part located at a lower portion, and the fixing part is detachably connected to the expansion bin by means of a connecting assembly.

7. The recreational vehicle according to claim 6, wherein the connecting assembly comprises a mounting support arranged on a top of an external wall of the expansion bin and a polygonal extension rod horizontally inserted into the mounting support, and one end of the polygonal extension rod close to the supporting arm extends into a limiting recess on the fixing part.

8. The recreational vehicle according to claim 6, wherein a top of the recreational vehicle compartment is provided with a tarpaulin track configured to fix one end of an awning tarpaulin, and the other end of the awning tarpaulin is fixedly wound around the reel.

* * * * *